UNITED STATES PATENT OFFICE.

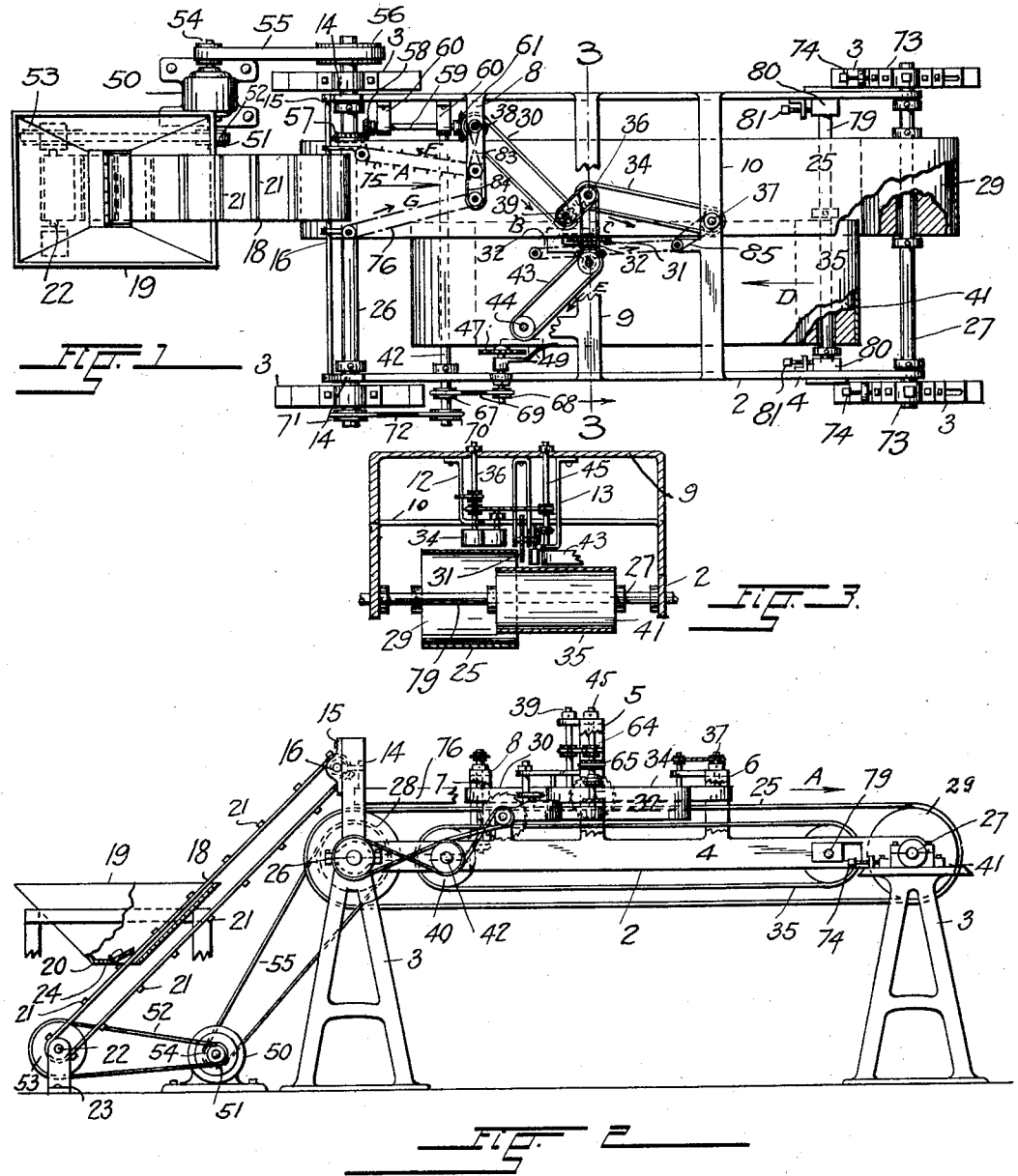

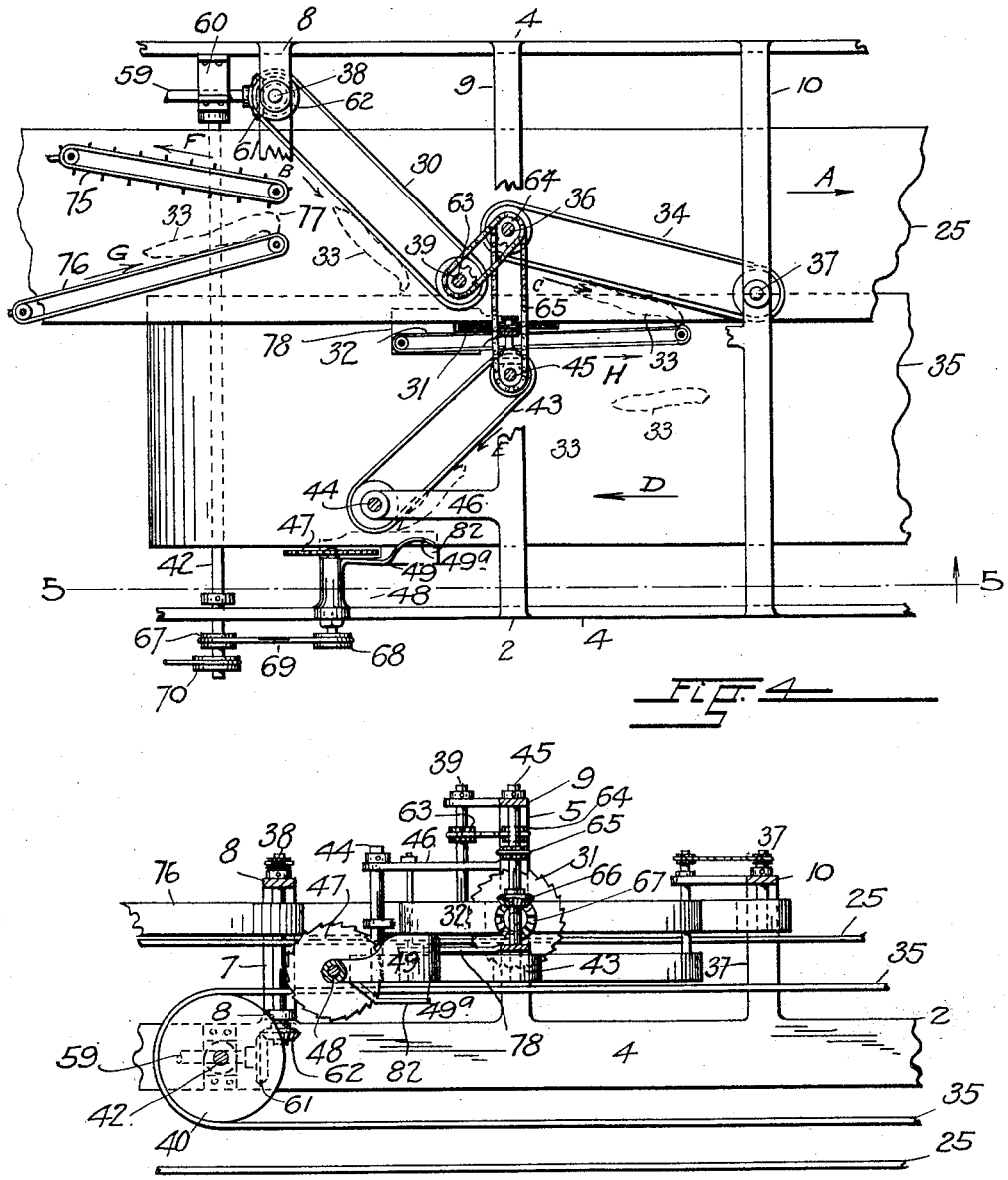

CHARLES J. HOOKER AND BEN ROBERTS, OF FORT LUPTON, COLORADO.

BEAN-SNIPPING MACHINE.

1,385,550. Specification of Letters Patent. Patented July 26, 1921.

Application filed February 8, 1919. Serial No. 275,817.

*To all whom it may concern:*

Be it known that we, CHARLES J. HOOKER and BEN ROBERTS, citizens of the United States, residing at Fort Lupton, in the county of Weld and State of Colorado, have invented certain new and useful Improvements in Bean-Snipping Machines, of which the following is a specification.

This invention relates to machines for snipping the ends off string beans at canning factories and other places where beans in large quantities are prepared for consumption.

It is the primary object of the present invention to provide a simple mechanism which automatically cuts both ends off string beans fed thereto from a hopper or other source of supply.

The mechanism comprises with this end in view two cutting elements, means which mechanically feed the beans in the proper position for the severance of one of their tips, to one of the elements, and means which automatically reverse their position and feed them to the other element for the removal of their other tips.

An illustrative embodiment of our invention has been shown in the accompanying drawings in which like characters of reference designate corresponding parts throughout the several views and in which—

Figure 1 represents a partially sectional plan view of the machine,

Fig. 2, a side elevation of the same,

Fig. 3, a section on the line 3—3, Fig. 1,

Fig. 4, an enlarged plan view of the cutting elements and adjoining parts of the feeding mechanism comprised in the machine, and Fig. 5, a section taken on the line 5—5, Fig. 4.

Referring more specifically to the drawings, the reference numeral 2 designates the supporting structure of the machine which in its preferred form comprises four standards 3 and a frame horizontally supported thereon.

The frame is composed of parallel side bars 4 and a superstructure which has bearings for the support of the coöperative parts of the cutting and feeding mechanisms of the machine.

The superstructure consists of two pairs of uprights 5 and 6 connected by cross-bars 9 and 10, an upright 7 having vertically alined, inwardly extending bearings 8, and hangers 12 and 13 which are suspended from the cross-bar 9 for the purpose hereinafter to be described.

The supporting frame has, furthermore, a pair of uprights 14 at its forward end, which carry bearings 15 for the support of the upper drum-shaft 16 of an elevator 18 hereinafter to be described.

The beans to be snipped are contained in a hopper 19 having an opening in its bottom 20 through which moves the upper stretch of an endless belt elevator 18.

The belt has on its outer surface transverse slats 21 which remove the beans contained in the hopper, by the upward movement of the portion of the belt within the hopper, which extends in substantially parallel relation and in close proximity to a side thereof.

The elevator-belt is mounted upon drums on the before-mentioned shaft 16 and a therewith parallel lower shaft 22 which is supported in boxes 23 on the floor on which the machine is standing.

The part of the opening in the bottom of the hopper not occupied by the belt is closed by a hinged lid 24 which rests upon the upper surface of the belt.

The beans are discharged over the upper end of the elevator onto a horizontally extending belt-conveyer 25 which is stretched around drums 28 and 29 mounted on parallel shafts 26 and 27 which are supported in pillow-boxes on the standards 3.

The forward drum 28 of the conveyer is fixed on the shaft upon which it is mounted, and the drum 29 at the opposite end of the same is rotatably supported on the shaft 27 which is fixed in boxes 73 on the standards. The boxes are slidably mounted on the standards in connection with adjusting screws 74 for the purpose of tightening the belt.

The conveyer moving in the direction of the arrow A carries the beans between two endless belts 75 and 76 which extend convergently in close proximity to the upper surface thereof.

The space 77 between the last-mentioned belts at their point of nearest approach permits of the passage of but one bean at a time, it being the object of the belts to feed the beans singly and intermittently to the cutting element hereinafter to be described.

The belt 75 moving in the direction of the arrow F guides the beans toward and through the passage 77 and the belt 76 moving in the opposite direction, has outstanding sprockets which when a second bean is crowded into the passage, retract it for the unobstructed movement of the other.

The rollers around which the belts 75 and 76 are stretched are at one of their ends mounted in boxes suspended from the shaft 16 of the elevator and at their opposite ends are supported upon the before-mentioned bearing 8.

After the beans have passed through the space 77 between the belts 75 and 76, they encounter a belt 30 extending transversely of and in close proximity to the carrying surface of its upper stretch and moving in the direction of the arrow B.

The belt 30 is stretched around drums on shafts 38 and 39 one of which is rotatably mounted in the before-mentioned bearings 8 on the upright 7 and the other one of which is supported in bearings on the cross-bar 9 and the hanger 12 suspended therefrom.

The movement of the belt causes the beans to assume a position parallel thereto and they are in this position moved by the combined influences of the belt and the conveyer, toward the first cutting element of the machine.

This cutting element comprises a circular saw 31 which is rotatably supported in bearings on the hanger 13 beneath the cross-bar 9 of the superstructure of the frame.

The saw extends across the edge of the upper stretch of the conveyer 25 so that the beans moving transversely of the conveyer by the action of the belt 30, are brought into engagement with the cutting edge thereof.

A plate 78 extending beneath the edge of the conveyer across which the beans are moved into engagement with the cutting member, supports the projecting portions of the beans, and an endless belt 32 moving in parallel relation to the outer surface of the cutter, limits the outward movement of the beans.

The belt 32 is mounted on rollers one of which is supported on the plate 78 while the other one has a bearing on a projection of the cross-bar 10 of the superstructure.

It will thus be seen that the beans which in Fig. 4 of the drawings have been shown in broken lines 33 are by the coöperative actions of the several belts moved one by one into engagement with the rotary cutter which severs their tips at a distance from their ends determined by the position of the belt 32.

After the beans have thus been snipped, they continue their movement with the conveyer 25 past the cutting element until they encounter an endless belt 34 which extends transversely of and in close proximity to the upper surface of the conveyer.

The belt 34 is stretched around drums on shafts 36 and 37 rotating in bearings on the hanger 12 and the cross-bars 9 and 10. The beans by engagement witth this belt, which moves in the direction of the arrow C, assume a position parallel thereto and are in this position moved across the adjacent edge of the conveyer belt onto the subjacent upper stretch of a second conveyer 35 which it overlaps.

The second conveyer is stretched around two drums 40 and 41 one of which is loosely supported upon a fixed shaft 79 at the rear end of the machine, and the other one of which is mounted on a shaft 42 which is supported in bearings on the side bars 4 of the frame, rearward of the forward drum of the first-mentioned conveyer.

The shaft 79 is supported in boxes 80 which are slidably mounted on the side bars of the frame, in connection with adjusting screws 81 for the purpose of tensioning the belt.

The drums of the second conveyer are of smaller diameter than those of the other and extend in lapping relation thereto so that the second conveyer moves partially between the upper and lower stretches of the other for the purpose of receiving the beans which are moved across the edge of the larger belt by the action of the cross-belt 34 as hereinbefore explained.

The conveyer 35 moving in the direction of the arrow D, reverses the movement of the beans and causes them to move with their unsnipped ends forwardly, into engagement with a belt 43 which extends obliquely across the upper surface of the conveyer.

The belt is stretched around drums on shafts 44 and 45 which rotate respectively in bearings on the hanger 13 and the cross bar 9, and in a bearing on an arm 46 projecting laterally from the latter.

The belt moving in the direction of the arrow E, causes the beans to move lengthwise, still with their uncut ends foremost, toward the second cutting element which in construction and operation is similar to the other.

A circular saw 47 is rotatably mounted on a stud shaft 48 projecting inwardly from the adjacent side-bar 4 of the frame and a stop 49 secured to the same side-bar is bent around the cutting edge of the saw and has a curved extremity 49$^a$ in spaced relation to the end-portion of the belt 43.

The saw extending across the edge of the upper portion of the belt, severs the uncut ends of the beans as they are moved into engagement with the cutting edge thereof by the movement of the conveyer after the belt 43 has caused them to move across the edge of the belt against the stop 49 which determines the distance at which their tips are severed. A plate 82 extending below the portion of the edge of the conveyer forward of the cutter supports the beans during the cutting action.

The snipped beans continuing their movement with the conveyer are discharged at the forward end of the machine.

The coöperative elements of the snipping machine thus described receive their movement from a motor 50 of suitable construction through the intermediary of the following transmission mechanism.

A pulley 51 on the rotary element of the motor connects by means of a belt 52 with a larger pulley 53 on the lower shaft 22 of the inclined elevator, and a second pulley 54 on the motor is by means of a belt 55, connected with a pulley 56 on the forward shaft 26 of the belt-conveyer 25.

The last-mentioned shaft carries a beveled gear-wheel 57 meshing with a corresponding gear 58 at the end of a shaft 59 which is supported in boxes 60 fastened to the adjacent side-bar 4 of the supporting frame, and which at its opposite end is provided with a beveled gear-wheel 61 which operatively engages a corresponding gear-wheel 62 on the drum-shaft 38 of the oblique belt 30.

The drum-shaft 39 of the last-mentioned belt is provided with a sprocket wheel 63 which transmits its rotary movement to a sprocket wheel 64 on the shaft 36 of the second slanting belt 34.

A second sprocket-wheel on the last mentioned shaft is by means of a chain 65 connected with a sprocket wheel on the shaft 45 of the conveyer 43.

The last-mentioned shaft which is mounted in bearings on the cross-bar 9 and the hanger 13 suspended therefrom, carries a beveled gear wheel 66 to transmit its motion to a corresponding gear 67 on the saw of the first cutting element.

The rotary saw of the other cutting element receives its motion from the drum-shaft 42 of the conveyer 35 through the medium of a pair of pulleys 67 and 68 and a crossed belt 69, and the shaft 42 is rotated by its connection with the shaft 26 of the other conveyer through the medium of a pair of pulleys 70 and 71 and a crossed belt 72.

The belt 75 receives its movement from the shaft 38 on the bearing 8 through the medium of a cross-belt 83, and the belt 76 is connected with the other belt to move in conjunction therewith, by means of a belt 84.

The belt 32 which is the operation of the machine moves in the direction of the arrow H, Fig. 4, is operated by the connection of one of the rollers around which it is stretched, with the shaft 37 on the cross-bar 10 through the medium of a belt 85.

In the operation of the machine, the beans lifted from the hopper by the transverse cleats on the elevator, are delivered onto the forward end of the conveyer 25 which carries them through the space between the convergent belts 75 and 76 and thence into engagement with the first transverse belt 30 which causes them to assume the proper position for the severance of their tips before them are moved into contact with the first cutting element of the machine as hereinbefore described.

The beans are subsequently discharged onto the second conveyer 35 by their contact with the slanting belt 34 and this conveyer moving in a direction opposite to that of the first conveyer, carries them with their uncut ends foremost, into engagement with the slanting belt 43 which causes them to assume the proper position for the severance of their other tips by the action of the rotating saw of the second cutting element.

Having thus described our improved bean-snipping machine in the best form at present known to us, we desire it understood that variations in the construction and arrangement of its parts may be resorted to within the spirit of our invention as defined in the following claims:

1. In a bean-snipping machine, the combination with a cutting-element for severing the ends of beans, of a belt-conveyer and a transverse belt coöperating for feeding beans to the cutting element, and a pair of convergent belts above the conveyer which coöperate to cause beans carried thereon to move singly to the transverse belt.

2. In a bean-snipping machine, the combination with a cutting-element for severing the ends of beans, of a belt conveyer and a transverse belt coöperating for feeding beans to the cutting-element, and a slanting belt and a therewith converging sprocket-belt moving in opposite directions above the conveyer to cause beans carried thereon, to move singly to the transverse belt.

3. In a bean-snipping machine, a cutting-element, means for feeding beans thereto in the proper position for the severance of one of their ends, a second cutting-element, a conveyer, and a transverse surface which coöperate for feeding beans to the second cutting element in the proper position for the severance of an end thereof, and means for moving beans acted upon by the first cutting-element, onto the conveyer with their unsnipped ends foremost with relation to the direction of its movement.

4. In a bean-snipping machine, a cutting-element comprising a rotary cutter, an abutment for beans moving across the cutting edge thereof, a conveyer for carrying beans in a direction substantially parallel to the plane of rotation of the cutter, a belt moving in a transverse direction above the surface of the conveyer to direct beans carried thereon to the abutment, a second rotary cutter, an abutment for beans moving across the cutting-edge thereof, a conveyer for carrying beans in a direction opposite to that of the first conveyer and substantially parallel to the plane of rotation of the cutter, a belt moving in a transverse direction above the surface of the second conveyer to direct beans carried thereon, to the abutment of the second cutting-element, and means for moving beans from the first conveyer onto the second one.

5. In a bean-snipping machine, a cutter, means for feeding beans thereto for the severance of one of their ends, a second cutter, an abutment for beans moving across the cutting-edge of said second cutter, a conveyer for feeding beans to the second cutter, a transverse belt to direct beans carried on the conveyer, to said abutment, and means for moving beans acted upon by the first-mentioned cutter, onto the conveyer with their unsnipped ends foremost with relation to the direction in which the beans are carried.

6. In a bean-snipping element, two cutting-elements, two substantially horizontal conveyers placed with the carrying surface of one above that of the other and moving in opposite directions, means coöperative with each conveyer for feeding beans to one of the cutting-elements in the proper position for the severance of an end thereof, and means for causing beans to move lengthwise across a longitudinal edge of the upper carrying surface onto the lower one.

7. In a bean-snipping element, two cutting-elements, two substantially horizontal conveyers placed with the carrying-surface of one above that of the other and moving in opposite directions, means coöperative with each conveyer for feeding beans to one of the cutting-elements in the proper position for the severance of an end thereof, and a transverse surface to cause beans to move off the upper carrying surface onto the lower one.

8. In a bean-snipping element, two cutting-elements, two substantially horizontal conveyers placed with the carrying-surface of one above that of the other and moving in opposite directions, means coöperative with each conveyer for feeding beans to one of the cutting-elements in the proper position for the severance of an end thereof, and a belt moving in a transverse direction above the upper carrying surface, for causing beans to move off said surface onto the lower carrying surface.

9. In a bean-snipping machine, a smooth-faced belt conveyer, a cutting element beyond an edge thereof, and an obstructive member above the conveyer, extending slantingly toward said cutting element whereby to feed beans carried on the conveyer onto the same.

10. In a bean snipping machine, the combination of first and second cutters, belts for feeding beans thereto, means coöperating with one of the belts for feeding beans carried thereon, to one of said cutters, means coöperating with the other belt for feeding beans carried thereon, to the other cutter, and means for causing the beans to move from one belt to the other after their engagement with the first cutter.

In testimony whereof we have affixed our signatures.

CHARLES J. HOOKER.
BEN ROBERTS.